United States Patent
Ohlhoff et al.

(10) Patent No.: US 10,385,757 B2
(45) Date of Patent: Aug. 20, 2019

(54) COOLING DEVICE FOR AN INTERNAL COMBUSTION ENGINE OF A MOTOR VEHICLE

(75) Inventors: Joerg Ohlhoff, Wolfsburg (DE); Bernd Schiemann, Wierthe (DE); Marco Schmidt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1627 days.

(21) Appl. No.: 13/530,795

(22) Filed: Jun. 22, 2012

(65) Prior Publication Data

US 2012/0273163 A1 Nov. 1, 2012

Related U.S. Application Data

(63) Continuation of application No. PCT/EP2010/007217, filed on Nov. 29, 2010.

(30) Foreign Application Priority Data

Dec. 22, 2009 (DE) .................. 10 2009 059 930

(51) Int. Cl.
*F01P 3/18* (2006.01)
*F02B 29/04* (2006.01)
(Continued)

(52) U.S. Cl.
CPC ............ *F01P 3/18* (2013.01); *F02B 29/0462* (2013.01); *F02B 29/0475* (2013.01);
(Continued)

(58) Field of Classification Search
CPC . F28D 1/0435; F28F 9/002; F01P 3/18; F01P 2070/52
(Continued)

(56) References Cited

U.S. PATENT DOCUMENTS 3,929,201 A * 12/1975 Hoffman ................ B60K 11/04
180/68.4
4,303,052 A 12/1981 Manfredo et al.
(Continued)

FOREIGN PATENT DOCUMENTS

CN 10484671 A 7/2009
CN 101484672 A 7/2009
(Continued)

*Primary Examiner* — Jon T. Schermerhorn, Jr.
(74) *Attorney, Agent, or Firm* — Muncy, Geissler, Olds & Lowe, P.C.

(57) ABSTRACT

A cooling device for an internal combustion engine is provided. During assembly, the radiator and the cooler are connected by first connecting the radiator and the cooler via a lower plug-in connection as a result of a vertical joining motion and then bringing the radiator and the cooler into a slightly tilted position. The position is achieved via limited swiveling mobility of the lower plug-in connection, whereby the required degree of freedom is created so that the required distance of the radiator and of the cooler for attaching the upper first plug-in connection can be set. The upper-first plug-in connection is then attached in a final assembly step via an attachment device that is substantially orthogonal to the plane of the cooler. The limited mobility ensures that thermal or production-related tolerances due to the different operating temperatures of the radiator and the cooler are compensated during operation.

17 Claims, 1 Drawing Sheet

(51) Int. Cl.
*F28F 9/00* (2006.01)
*F28D 1/04* (2006.01)

(52) U.S. Cl.
CPC ............ *F28D 1/0435* (2013.01); *F28F 9/002* (2013.01); *F01P 2070/52* (2013.01); *Y02T 10/146* (2013.01)

(58) Field of Classification Search
USPC ......... 165/41, 44, 67, 104.11, 140; 180/68.4
See application file for complete search history.

(56) References Cited

U.S. PATENT DOCUMENTS

| | | | |
|---|---|---|---|
| 4,823,868 A | 4/1989 | Neebel | |
| 5,566,748 A * | 10/1996 | Christensen | ........ F02B 29/0475 165/140 |
| 5,657,817 A * | 8/1997 | Heine et al. | ..................... 165/67 |
| 6,029,345 A * | 2/2000 | Christensen | ........... B60K 11/04 165/140 |
| 6,273,182 B1 * | 8/2001 | Pautler et al. | ................... 165/67 |
| 6,533,027 B2 * | 3/2003 | Gille et al. | ....................... 165/67 |
| 8,025,045 B2 | 9/2011 | Pettersson et al. | |
| 8,474,512 B2 | 7/2013 | Pettersson et al. | |
| 2002/0195090 A1 * | 12/2002 | Marsh | ..................... F01P 7/165 123/563 |

FOREIGN PATENT DOCUMENTS

| | | |
|---|---|---|
| DE | 43 32 919 A1 | 5/1995 |
| DE | 44 25 350 A1 | 1/1996 |
| DE | 196 45 507 A1 | 5/1997 |
| DE | 199 53 787 A1 | 5/2001 |
| DE | 102 96 566 T5 | 4/2004 |
| DE | 10 2006 037 761 A1 | 2/2008 |
| EP | 0 036 756 B1 | 7/1984 |
| EP | 0 343 565 A2 | 11/1989 |
| FR | 2 710 587 A1 | 4/1995 |
| FR | 2 929 386 A1 | 10/2009 |
| WO | WO 97/42049 A1 | 11/1997 |

\* cited by examiner

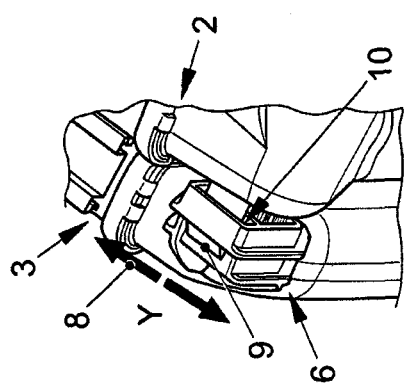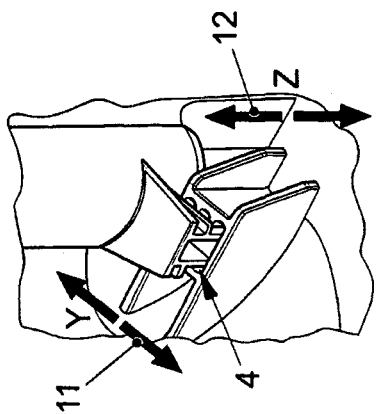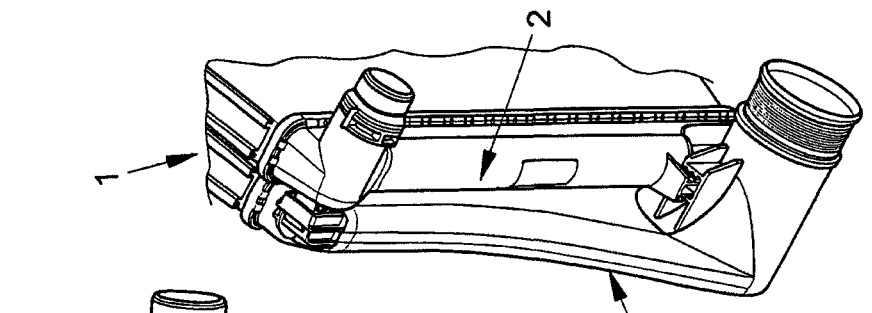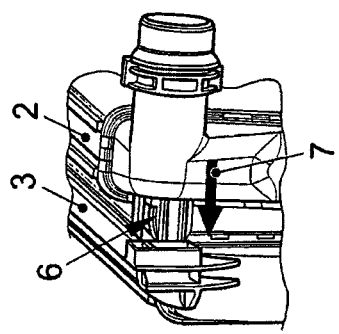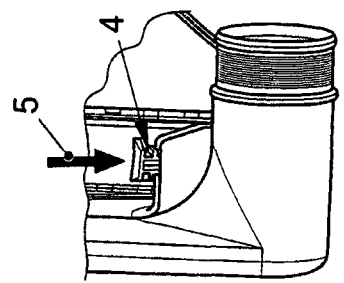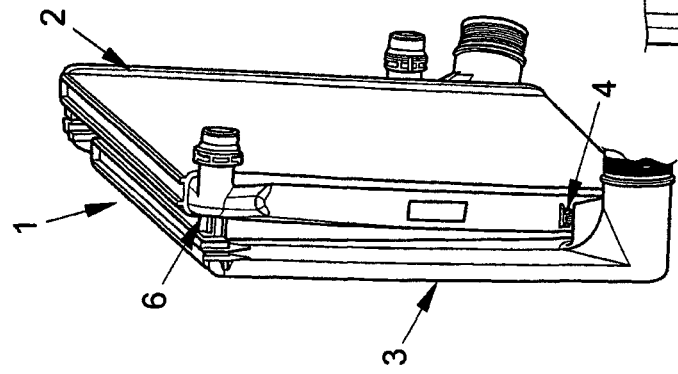

COOLING DEVICE FOR AN INTERNAL COMBUSTION ENGINE OF A MOTOR VEHICLE

This nonprovisional application is a continuation of International Application No. PCT/EP2010/007217, which was filed on Nov. 29, 2010, and which claims priority to German Patent Application No. DE 10 2009 059 930.4, which was filed in Germany on Dec. 22, 2009, and which are both herein incorporated by reference.

BACKGROUND OF THE INVENTION

Field of the Invention

The invention relates to a cooling device for coolants suppliable to an internal combustion engine of a motor vehicle, whereby the cooling device has a radiator and at least one further cooler connectable to the radiator via plug-in connections.

Description of the Background Art

A radiator is used in modern internal combustion engines for recooling the water used for cooling the engine. In particular, cooling of the hot cylinders during operation is necessary to prevent damage to the pistons on the cylinder wall and to avoid burning of the lubricant.

Typically used as a fastener are mounting flanges or mounting rails, formed on the radiator block and optionally having specially formed nuts insertable in these, at which the housings are attached with optionally also specially formed screws or bolts.

In contrast, charge air coolers are employed as additional components in internal combustion engines and are used to cool already pre-compressed air, to be supplied to these, for the purpose of further compression and thereby increasing the output power of internal combustion engines. To this end, the charge air cooler representing a heat exchanger has a radiator block with a tube system through which a cooling medium flows. To improve the heat exchange, the tube system is provided with fins or lamellae. The radiator block is surrounded by a housing, sealed off from it, for passing through charge air, as is disclosed, for example, in EP 0 036 756 B1 (which corresponds to U.S. Pat. No. 4,303,052) or EP 0 343 565 A2 (which corresponds to U.S. Pat. No. 4,823,868).

DE 43 32 919 A1, which has as its object a radiator with an intercooler attached thereto, discloses a fastener, designed in each case from a self-locking screw on the charge air cooler, the screw lies form-fittingly against the charge air cooler in a duct with an elastic lining, and from an opening for this screw on the narrow side of the radiator, whereby the screw can engage behind the edge of the opening. The fastening of the radiator occurs by insertion of the same from above into the intercooler and locking by the locking elements, disposed in the lower area, and subsequent screwing of the screws into the openings.

The arrangement or design of the fastener on the radiator block for a cooling air housing, surrounding the block, or a cooling air supply hood is relatively expensive with respect to the construction cost due to the metalworking processes, but also with respect to assembly and disassembly.

Also, DE 196 45 507 A1, which is incorporated herein by reference, describes a fastening arrangement for an air supply hood on an intercooler, which has two air supply boxes, opposite to one another and disposed on a rectangular radiator block, for the charge air inlet and outlet. The air supply hood is disposed detachably on the cooling air inlet side with fastening elements on the air supply boxes and between the boxes. At least one plastic holding tab having at least one tongue, disposed on the one air supply box, with a substantially rectangular cross section and on the side opposite to the holding tab two plastic stop members for two stops, disposed spaced apart on the other air supply box, are used to this end.

DE 10 2006 037 761 A1, which is incorporated herein by reference, also discloses a fastening arrangement for an intercooler connected to a radiator, whereby the radiator optionally together with or also without the intercooler can be fixed to a holder in the front end of the motor vehicle, in order to thus create a modular structure. The fixing arrangement for the water cooler has a downward projecting adapter, which matches the respective adapter of the intercooler, so that the radiator can also be fixed to the holding structure without interconnection of the intercooler.

SUMMARY OF THE INVENTION

It is therefore an object of the invention to provide a cooling device for an internal combustion engine of a motor vehicle, the device which enables rapid assembly and high process security. Further, the manufacturing costs and the necessary installation space are to be reduced.

According to an embodiment of the invention, a cooling device is provided for an internal combustion engine, the device in which the radiator and the cooler are disposed in different, substantially parallel planes and are capable for the supplied ambient air to flow through one after another and in which the plug-in connections in their fixing position, connecting the radiator to the cooler, in each case are made limited in motion in at least one direction in the plane parallel to the cooler, whereby at least one first plug-in connection in a first direction and at least one second plug-in connection in a second direction are made movable transverse to the first direction. Because of this, a simple, particularly even tool-free connection of the radiator to the cooler, on the one hand, and a problem-free assembly of the thus created structural unit to a support structure in the front area of the motor vehicle, on the other, are realized simultaneously in a surprisingly simple manner; this enables at the same time compensation of different thermal expansions of the radiator and of the cooler by means of the limited mobility. According to an embodiment of the invention, thus a simple modular structure is made possible, allowing for a problem-free combination of the radiator and of the cooler with a great difference in operational temperatures and the different thermal expansion associated therewith. In addition, this mobility is used at the same time for compensating for production tolerances, simplifying assembly. In this case, the radiator with the cooler can be made so the coolant can flow through one after another in a series connection or parallel connection of the coolant. However, they can be disposed independent of another in different coolant circuits.

In so doing, further improved tolerance compensation is also made possible in that the second plug-in connection has a limited mobility in two spatial axes orthogonal to one another. In this way, the problem-free thermal expansion in any direction in the same plane is made possible, so that the radiator and the cooler can be connected together without the risk of stresses arising during operation.

In addition, it is also advantageous, when the second plug-in connection has an assembly direction in a plane substantially parallel to the plane of the cooler. As a result, the radiator and the cooler can be easily inserted together in the front area of the motor vehicle before the internal combustion engine from above into the respective side support structure, whereby the second plug-in connection defines the end position.

The vertical fixation could be achieved by the side support structure alone. Especially simple, in contrast, is a variation of the present invention in which a first plug-in connection has an assembly direction substantially orthogonal to the plane of the cooler. As a result, therefore, the fastening of the radiator and the cooler by the first plug-in connection occurs transverse to the particular main extension plane, so that a rapid and simple connection is achieved in this way.

A further, especially practical embodiment of the present invention is also achieved, when the radiator is connected detachably to the cooler via the plug-in connection, so that in the case of service or damage, the radiator or cooler can be removed or replaced separately from one another.

In this case, according to another embodiment, at least one plug-in connection can be made as a snap connection, so that the connection engages automatically when a predetermined target position is reached and reliably determines the thus set position. In a detachable design of the snap connection, it can also be made detachable, for example, solely by means of a suitable tool.

It is furthermore advantageous, when in regard to an installation position of the motor vehicle the first plug-in connection is disposed or arranged above the second plug-in connection, so that during assembly first the second plug-in connection is inserted into its predetermined position and is locked in place if necessary, and then the first plug-in connection is shifted into the lock-in position by a swiveling motion around the second plug-in connection, which because of its limited mobility enables a correspondingly limited swiveling motion.

The cooler can have a structural shape specific for any application. It is especially advisable, however, when the cooler is made as a charge air cooler or a low-temperature cooler, which can be expanded in a modular manner according to the particular internal combustion engine used in the motor vehicle. Of course, in addition to the radiator, a plurality of additional coolers can be used, which can be disposed one behind the other in different planes or also next to one another in the same plane.

In an embodiment of the invention, in which a gaseous coolant can flow through the cooler, preferably for a coolant temperature of the cooler up to 100° C. above of the liquid coolant of the radiator, is suitable for the compensation, realizable according to the invention, of different thermal expansions.

It is also especially helpful in practice when the radiator is connectable to the cooler with four paired, structurally identical plug-in connections, so that the modular expandability is also possible without difficulty in cooling devices used in already available motor vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a cooling device during the assembly in a view from the left;

FIG. 2 shows in an enlarged illustration an upper first plug-in connection of the cooling device shown in FIG. 1;

FIG. 3 shows in an enlarged illustration a lower second plug-in connection of the cooling device shown in FIG. 1;

FIG. 4 shows the cooling device of FIG. 1 in a functionally ready installation position;

FIG. 5 shows in an enlarged illustration the installation position of the upper first plug-in connection of the cooling device shown in FIG. 4;

FIG. 6 shows in an enlarged illustration the installation position of the lower plug-in connection of the cooling device shown in FIG. 4.

DETAILED DESCRIPTION

FIGS. 1 to 3 show a cooling device 1 with a radiator 2 and with another cooler 3, made as a charge air cooler, for an internal combustion engine (not shown) of a motor vehicle during the assembly process. The cooler 3 is disposed in front of radiator 2 in the driving direction of the motor vehicle, and therefore the incoming ambient air flows through the cooler first. During assembly, radiator 2 and cooler 3 are connected to form a structural unit, in that these are connected first by a lower second plug-in connection 4, shown in greater detail in FIG. 3, by a vertical joining motion in the direction of arrow 5 and are then brought into a slightly tilted position. The position is achieved by means of limited swiveling mobility of the lower second plug-in connection 4, whereby the required degree of freedom is created to be able to set the required distance of radiator 2 and cooler 3 for fixing the upper first plug-in connection 6. The fixation of the upper first plug-in connection 6 then occurs in a final assembly step by a substantially vertical fixing direction, to the plane of cooler 3, in accordance with arrow 7 shown in FIG. 2.

FIGS. 4 to 6 show the cooling device 1 of FIG. 1 in a functionally ready installation position. Proceeding from cooling device 1, connected to form an assembly unit and fixable in a frame structure (not shown) in the motor vehicle, and connected to form a structural unit, including radiator 2 and additional cooler 3, first plug-in connection 6, shown in FIG. 5, permits a compensation of tolerances or different thermal expansions due to the different working temperatures of radiator 2 relative to additional cooler 3 by a limited mobility in the Y-direction of double arrow 8 in a first direction parallel to the plane of radiator 2. For this purpose, plug-in connection 6 has a locking projection 9 connected to radiator 2, which locks form-fittingly in a slot-shaped through hole 10 of cooler 3, whereby through hole 10 is dimensioned according to the desired mobility larger than the maximum width of locking projection 9. In contrast, the lower second plug-in connection 4, shown in FIG. 6, in addition to the mobility in the Y-direction indicated by a double arrow 11, has further a mobility in the Z-direction indicated by another double arrow 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling device for a coolant suppliable to an internal combustion engine of a motor vehicle, the cooling device comprising:
   a radiator; and
   a cooler connectable to the radiator via at least a first plug-in connection and a second plug-in connection,
   wherein the radiator and the cooler are disposed in different, substantially parallel planes and are configured such that supplied ambient air flows through one after another in a first direction,
   wherein the first and second plug-in connections in their fixed position, connect the radiator to the cooler, and have limited motion in at least one direction in a plane substantially parallel to the cooler,
   wherein the first plug-in connection is a snap connection comprising a locking projection and a through hole,
   wherein the locking projection is formed on the radiator, and the through hole is formed on the cooler and is configured to receive the locking projection,
   wherein the first plug-in connection, inserted in the first direction to engage the snap connection automatically into a target position, and the second plug-in connection, inserted in a second direction that is substantially perpendicular to the first direction, are movable in a third direction that is perpendicular to the first direction and perpendicular to the second direction,
   wherein, when the locking projection is received in the through hole, a gap is disposed in the third direction between the through hole and the locking projection.

2. The cooling device according to claim 1, wherein the second plug-in connection has a limited mobility in two directions perpendicular to one another.

3. The cooling device according to claim 1, wherein the second direction is substantially parallel to the plane of the cooler.

4. The cooling device according to claim 1, wherein the first direction is substantially orthogonal to the plane of the cooler.

5. The cooling device according to claim 1, wherein the radiator is connected detachably to the cooler via the at least first and second plug-in connections.

6. The cooling device according to claim 1, wherein the second plug-in connection is a snap connection.

7. The cooling device according to claim 1, wherein the first plug-in connection is disposed above the second plug-in connection in the second direction.

8. The cooling device according to claim 1, wherein the cooler is a charge air cooler or a low-temperature cooler.

9. The cooling device according to claim 1, wherein the cooler is configured to allow a gaseous coolant to flow through the cooler.

10. The cooling device according to claim 1, wherein the cooler further comprises an additional two plug-in connections, and
    wherein the radiator is connectable to the cooler with the first plug-in connection, the second plug-in connection and the additional two plug-in connections.

11. The cooling device according to claim 10, wherein an insertion portion of each of the first plug in connection, the second plug-in connection and the additional two plug-in connections is integrally connected to the cooler.

12. The cooling device according to claim 1, wherein the radiator and the cooler are connected via coolant lines which allow the coolant to flow serially through one after the other.

13. The cooling device according to claim 1, wherein the second plug-in connection allows for limited swiveling motion in the first direction.

14. The cooling device according to claim 1, wherein the radiator and the cooler are connected in parallel via coolant lines.

15. The cooling device according to claim 1, wherein the radiator and the cooler are independently disposed in different coolant circuits.

16. The cooling device according to claim 1, wherein the through hole is a slot-shaped through hole.

17. The cooling device according to claim 16, wherein a width of the slot-shaped through hole is larger than a width of the locking projection.

* * * * *